United States Patent Office 3,534,123
Patented Oct. 13, 1970

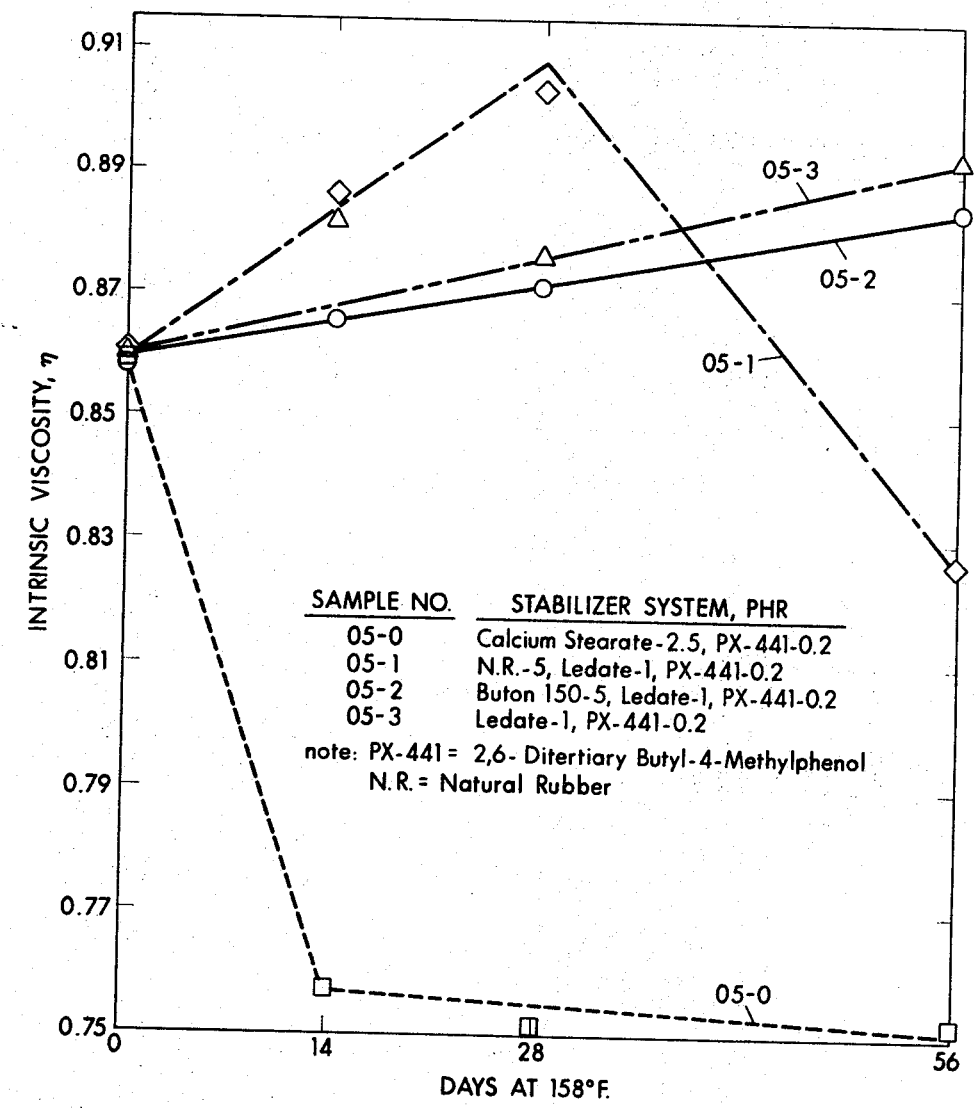

---

3,534,123
HEAT AND AGING STABILIZATION OF UNCURED HALOGENATED BUTYL RUBBER
Howard K. Bostock, Cranford, and Thomas A. Manuel, Westfield, N.J., assignors to Esso Research and Engineering Company, a corporation of Delaware
Filed May 4, 1967, Ser. No. 636,202
Int. Cl. C08d 9/08
U.S. Cl. 260—888                    14 Claims

ABSTRACT OF THE DISCLOSURE

Uncured halogenated butyl rubber is stabilized against premature gelation, halogen loss, and molecular weight degradation during prevlucanization processing and storage by blending with a highly unsaturated compound having an Iiodine No. of 100 to 400 such as rapeseed oil and polybutadiene, an antioxidant such as 2,6-ditertiary butyl-4-methylphenol, and p-isopropoxy diphenylamine, and a heavy metal thiocarbamate having the general formula:

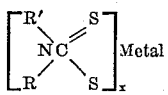

wherein R is an alkyl group having from 1 to 4 carbon atoms and preferably 1 to 2 carbon atoms; R' is an alkyl, aryl, alkaryl or cycloparaffin group having from 1 to 10 carbon atoms and is preferably an alkyl group having 1 to 4 carbon atoms; x is the valence of the heavy metal and can be an integer of 2 to 4. The heavy metal may be selected from those elements in groups I-B, II-B, IV-A, V-A, VI-A and VIII of the Periodic Chart of the elements.

---

BACKGROUND OF INVENTION

This invention relates to the stabilization of halogenated butyl rubber. More specifically, it relates to methods of stabilizing uncured halogenated butyl rubber against premature gelation, halogen loss, and molecular weight degradation during processing and storage. The expression "butyl rubber" as employed in the specification and claims is intended to include copolymers made from a polymerization reactant mixture having therein about 70–99.5% by weight of an isoolefin which has about 4–7 carbon atoms and about 30–0.5% by weight of a conjugated multiolefin having about 4–14 carbon atoms. The resulting copolymer contains 85–99.5% of combined isoolefin and 0.5 to 15% of combined multiolefin. The term "butyl rubber" is described in an article by R. M. Thomas et al. in Industrial Engineering and Chemistry, vol. 32, pp. 1283 et seq., October, 1940.

The butyl rubber generally has a Staudinger molecular weight between about 20,000 to about 500,000; preferably about 25,000 to about 200,000; especially 45,000 to 60,000; and a Wijs iodine number of about 0.5 to about 50; preferably 1 to 15. The preparation of butyl rubber is described in U.S. Pat. 2,356,128, which is incorporated herein by reference.

Butyl rubber, being a low unsaturation vulcanizable rubbery copolymer, is known to be difficult to adhere to or covulcanize with highly unsaturated rubbers. This damaging limitation has been overcome to some degree by the halogenation of butyl rubber.

A typical method of halogenating butyl rubber is to form a solution containing betwen about 1 to about 60% by weight of butyl rubber in an organic solvent such as hexane and to contact this butyl rubber cement with a halogen gas for a period of about 25 minutes whereby halogenated butyl rubber and hydrogen halide are formed, the copolymer containing up to 1 atom of halogen per double bond in the copolymer. The preparation of halogenated butyl rubbers is described in U.S. Pat. 3,099,644, which is incorporated herein by reference. This invention is not intended to be limited in any way by the manner in which the butyl rubber is halogenated. Chlorinated and brominated butyl rubber are suitable for use in this invention.

Although these halogenated butyl rubbers are found to be more compatible with the highly unsaturated rubbers, they also are found to be less stable than butyl rubber itself. Brominated butyl rubber has been found to be so unstable that lachrymatory gases are evolved at temperatures ranging from about 250° F. to commercial extrusion temperatures of about 375° F. or higher. These evolved halogen-containing materials are also corrosive to equipment. Further, premature gelation has been known to occur during storage of bales of the brominated rubbers.

The instability evidenced on prolonged storage at room temperature or under conditions often encountered in polymer finishing operations constitutes a major deterrent to the practical use of brominated butyl rubber. It is essential that polymer properties remain relatively constant until it is desired to vulcanize the rubber into a rubber article. Chlorinated butyl rubber is stabilized according to current technology by a combination of metal stearates and antioxidants; these stabilizers are inadequate for brominated butyl rubber stabilization.

Unvulcanized chlorinated or brominated butyl rubbers have been stabilized to some degree by derivatives of thiocarbamic acids, such as lead dimethyl dithiocarbamate, e.g. see U.S. Pat. 2,958,675. Also, heat resistant covulcanizates of halogenated butyl rubbers and highly unsaturated rubbers, such as polybutadiene, have been formed by covulcanization of the blended rubbers in the presence of thiocarbamates, e.g. see British Pat. 862,698.

SUMMARY OF INVENTION

It has now been found that, surprisingly, a high degree of stability can be imparted to the uncured halogenated butyl rubber by the addition of an unsaturated compound in combination with a heavy metal thiocarbamate and preferably an antioxidant. Specifically, the improved products of this invention are obtained by blending the thiocarbamate, an unsaturated compound such as natural rubber or a polybutadiene with the halogenated butyl rubber. Preferably an antioxidant is also added.

DETAILED DESCRIPTION

The halogenated rubbery isoolefin-multiolefin-containing copolymers, particularly chlorinated or brominated butyl rubbers, which are advantageously stabilized in accordance with the present invention, are produced by careful chlorination and/or bromination of the rubbery isoolefin-multiolefin copolymers in a manner which does not degrade the molecular weight thereof as more fully described hereinafter.

In order to produce halogenated butyl rubber, the halogenation is regulated so that the resulting rubber will contain about at least 0.5 wt. percent (preferably at least about 1.0 wt. percent) combined halogen, but not more than about "X" wt. percent combined chlorine or 3.0 "X" wt. percent combined bromine wherein:

$$X = \frac{M_3 L}{(100-L)M_1 + L(M_2+M_3)} \times 100$$

and:

L=mole percent of the multiolefin in the polymer,
$M_1$=molecular weight of the isoolefin,
$M_2$=molecular weight of the multiolefin,
$M_3$=atomic weight of chlorine or bromine.

Suitable halogenating agents which may be employed are gaseous chlorine, liquid bromine, alkali metal hypochlorites or hypobromites, $C_4$–$C_{10}$ teriary alkyl hypochlorites, sulfur bromides, sulfuryl chlorides, pyridinium chloride perchloride, N-bromosuccinimide, alpha-chloroacetanilide, N,N'-dichloro-5,5-dimethyl hydantoin, iodine halides, trichlorophenochloride, N-chloroacetamide, beta-bromo-methyl-phthalimide. Preferred halogenating agents are gaseous chlorine, liquid bromine, sulfuryl chloride, sulfuryl bromide, chlorohydantoins, bromohydantoins, iodine monochloride and related materials. The halogenation is generally conducted at temperatures above 0° to about $+100°$ C., depending upon the particular halogenating agent, for about 1 minute to several hours. An advantageous pressure range is from about 0.1 to 1000 p.s.i.a., atmospheric pressure being satisfactory. The halogenation may be acomplished by preparing a 1 to 30 wt. percent solution of such polymers as above in a substantially inert liquid organic solvent such as $C_3$–$C_8$ substantially inert hydrocarbons or halogenated derivatives of saturated hydrocarbons, e.g. hexane, mineral spirits, cyclohexne, benzene, chlorobenzene, chloroform, carbon tetrachloride, mixtures thereof, etc. and adding thereto the halogenating agent which may optionally be dissolved in a substantially inert $C_3$–$C_{12}$ hydrocarbon, a $C_1$–$C_5$ alkyl chloride, carbon tetrachloride, carbon disulfide, etc. If chlorine gas is employed, it may also be diluted with up to about 50, preferably 0.1 to 5, times its volume of a substantially inert gas such as nitrogen, methane, carbon dioxide, etc.

The resulting halogenated isoolefin-multiolefin-containing copolymer may be recovered by precipitation with oxygenated hydrocarbons, particularly alcohols or ketones such as acetone or any other known non-solvent for the halogenated butyl rubber and dried at about 1 to 760 millimeters or higher of mercury pressure absolute, at about 0° to 180° C., preferably at about 50° to 150° C., e.g. 70° C. Other methods of recovering the chlorinated polymer are by conventional spray or drum drying techniques. Alternately, the solution of the halogenated rubber may be injected into a vessel containing steam and/or agitated water heated to temperature sufficient to volatilize the solvent and form an aqueous slurry of the chlorinated rubber. This halogenated rubber may be separated from the slurry by filtration and drying or recovered as a crumb or as a dense sheet or slab by conventional hot milling and/or extruding procedures. As so produced, the halogenated rubbery polymer has a Staudinger molecular weight within the range of approximately 20,000 to 500,000 preferably 25,000 to 200,000.

The heavy metal thiocarbamates coming with the purview of the invention have the general formula:

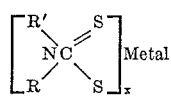

wherein R is an alkyl group having from 1 to 4 carbon atoms and preferably 1 to 2 carbon atoms; R' is an alkyl, aryl, alkaryl or cycloparaffin group having from 1 to 10 crbon atoms and is preferably an alkyl group having 1 to 4 carbon atoms; $x$ is the valence of the heavy metal and can be an integer of 2 to 4; the hevy metal may be selected from those elements in group I-B, II-B, IV-A, V-A, VI-A and VIII of the Periodic Chart of the elements as published on pages 56 and 57 of the Handbook of Chemistry by Lange, 8th edition, 1952, and preferably is divalent lead or tetravalent tellurium.

The dithiocarbamate salt may be a single salt or a mixture of salts, e.g. lead dimethyl dithiocarbamate my be combined with tellurium diethyl dithiocrbamate. Other dithiocarbamates that are suitable for the purposes of this invention include selenium diethyl thiocarbamate, zinc dimethyl dithiocarbamate, tellurium benzyl dithiocarbamate, zinc butyl dithiocarbamate, etc. For best results, the thiocarbamate portion of the blend should comprise either the lead or tellurium salt alone or a combination of these salts. The thiocarbamates are used in a range from 0.1 to 5.0 wt. percent, preferably from 0.5 to 2 wt. percent, and most preferably from 0.5 to 1.0 wt. percent.

Illustrative of the unsaturated compounds suitable for use in this invention are any highly unsaturated materials having an iodine number from 100 to 400, preferably 150 to 350, and a molecular weight of from 500 to 1 million, preferably 1500 to 10,000. Typical examples of suitable compounds include peanut oil, soya oil, rapeseed oil, polybutadiene, styrene butadiene copolymers and natural rubber. The soya, peanut and rapeseed oils are preferably bodied by air blowing to a molecular weight of about 2000 to about 3000 prior to use. The more preferred materials are polybutadiene of a molecular weight from 1500 to 10,000 and natural rubber. The most preferred highly unsaturated compound is a polybutadiene with a molecular weight in the range of about 1500 to about 2500, commonly known by the trademark of "Buton 150." The unsaturated compound is utilized in the range of 1 to 10 wt. percent based on the weight of halogenated butyl rubber, more preferably from 3 to 8 wt. percent, and most preferably from 4 to 6 wt. percent.

Illustrative of the antioxidants which may be used in the practice of this invention are 2,6-ditertiary butyl-4-methylphenol, commonly known as "Ionol" or "Parabar 441," 4,4'-thiobis-3-methyl-6-t-butylphenol, commonly known as "Santowhite Crystals," phenyl-beta-naphthylamine, 4,4'-methylenebis (2,6-di-tertiary butylphenol), p-isopropoxy diphenylamine and other common materials of the amine and phenol types as listed in Materials and Compounding Ingredients for Rubber and Plastics (compiled by Rubber World), Publishers Printing Co., New York, 1965. The more preferred antioxidants are "Ionol" and "Santowhite Crystals," the most preferred being "Ionol." The antioxidant is normally used in the range from 0.05 to 0.5 wt. percent, preferably 0.2–0.3 wt. percent, based on the weight of the halogenated butyl rubber.

In its more preferred embodiment, the compounding process is carried out in solution. The halogenated butyl rubber is dissolved in any suitable solvent. These include carbon tetrachloride chloroform, staturated hydrocarbons having 3 to 12 carbon atoms, preferably 4 to 8 carbon atoms, such as cyclohexane, cyclopentane, butane, isobutane, n-pentane, isopentane, neopentane, n-hexane, isohexane, 3-methylpentane, neohexane, diisopropyl, n-heptane, or even aromatic hydrocarbons such as benzene or toluene or mixtures of any of these. The preferred solvent is n-hexane. Such a polymer cement may be obtained as effluent from a chlorination and subsequent washing procedure.

In general, the concentration of the halogenated butyl rubber having a viscosity average molecular weight of about 20,000 to 500,000, if the solvent is an inert hydrocarbon such as normal hexane, will be between 1 and 60% by weight, preferably from 5 to 20% and most preferably from about 12 to 18%. The thiocarbamate, the unsaturated compound and, if desired, the antioxidant are blended into the halogenated butyl rubber solution, at a temperature of about 25° C. to about 75° C. with continuous agitation for about 2 to about 30 minutes, preferably from 3 to about 15 minutes, e.g. about 5 minutes. The compound halogenated butyl rubber is then separated from the solvent by steam stripping or precipitation. For example, the polymer may be precipitated with acetone or other known non-solvents for the polymer and dried under about 1 to 760 millimeters or higher of mercury pressure at a temperature of between 0° and 180° C., preferably between 50 and 150° C., e.g. 70° C. Other methods of recovering the compound halogenated butyl polymer from the hydrocarbon solution are conventional spray or drum drying techniques or other evaporative techniques.

After separation of the compounded rubber from the solvent, it is then dried by mill drying or extrusion drying at temperatures between 250 and 475° F., preferably 375 to 400° F., especially 375° F. The dried compounded rubber is then chopped and baled in a manner similar to that described in U.S. Pat. 3,264,387 and stored for later use.

The compounded modified rubbery polymers of the present invention may be vulcanized by heating the compounded polymer in the presence of suitable curing agents to a temperature between about 200 and about 400° F., preferably about 275 to about 350° F., for a few minutes to 40 to 60 minutes. The vulcanized modified rubbery polymer is useful in rubber articles such as tires, curing bags, rubber belts, hoses and the like.

The following examples are presented to give a clear understanding how the processes of the invention may be carried out as well as the benefits obtained from its use.

EXAMPLE 1

Bromination

All of the examples describe the use of brominated sutyl rubber (bromobutyl rubber) from a single batch made by direct bromination of butyl cement. A charge of 100 lbs. of hexane cement containing 16% by weight of Enjay Butyl 268 (butyl rubber having about 1.5 mole percent unsaturation and a viscosity average molecular weight of about 450,000) was charged to a recreation vessel and thereafter 5.2 wt. percent bromine (378 grams, 2.36 moles) in a total of 1000 milliliters of dried, low unsaturation hexane was added and the charge lines were flushed with 2.5 gallons of hexane. The cement was agitated for about 3 minutes. A charge of 95 grams (2.36 moles) of sodium hydroxide in 1000 ml. water was added; the elapsed time from the start of the bromine addition to the caustic addition was about 5 minutes. The resultant brominated butyl rubber cement was then washed with water. This brominated butyl rubber contained about 2.35 to 2.40 wt. percent bromide and had a viscosity average molecular weight of about 465,000.

EXAMPLE 2

1.25 grams of calcium stearate and 0.1 grams of "Ionol" were added to 475 grams of the halogenated rubber cement of Example 1. The material was thoroughly mixed, poured into a glass drying dish to a maximum depth of ½ inch, and then vacuum oven dried for 24 hours at 50° C. This sample was then masticated (Brabended) in a Brabender Plasticorder for approximately 22 minutes. In operation this instrument simulates extrusion drying conditions in supplying mechanical shear energy and high heat to a contained rubber sample. Retention of properties under Brabending conditions therefore indicates the suitability of a rubber for commercial processing. It is desirable for a rubber to retain its halogen content and initial molecular weight, to undergo no gel formation, and to exhibit constant torque through out the Brabending operation, once temperature equilibrium has been attained. The Brabender Plasticorder is essentially a torque measuring rheometer. Various measuring heads can be installed in its small (51 cc.) mixing chamber. For stabilization work, the chamber had a high shear cam style rotor similar to that of a minature Banbury mixer. A heat transfer oil is circulated through the mixing chamber jacket. Torque, stock temperature and jacket temperature are recorded continuously. The standard Brabending conditions used (except as otherwise specified) throughout these runs were jacket temperature 302° F., rotor speed 63 r.p.m., length of run 22 minutes and charge 46 grams. After the Brabending run, conventional analyses were carried out on the recovered polymer. Analysis of the above sample showed a loss of 24% of the initially contained halogen, a decrease in viscosity average molecular weight of 29%, a 17% increase in Brabending torque and the presence of 32 wt. percent of gel. Such degradation destroys the utility of a rubber.

EXAMPLE 3

0.1 gram of Ionol and 2.5 grams of Buton 150 were added to 475 grams of the halogenated rubber cement of Example 1 and tested as in Example 2. The sample showed a loss of 31% of initial halogen, a viscosity-average molecular weight decreases of 29%, a torque retention of 91% and no gelation.

EXAMPLE 4

Example 3 was repeated substituting 2.5 grams of natural rubber in place of the Buton 150. After testing, this sample showed a loss of 28% of initial bromine, a viscosity-average molecular weight decrease of 14%, a torque retention of 95% and no gelation.

EXAMPLE 5

0.1 gram of Ionol and 0.5 gram of Ledate (lead dimethyl dithiocarbamate) were added to 475 grams of cement and tested as in Example 2. The sample showed a loss of 12% of initial halogen, a viscosity-average molecular weight decrease of 7% a torque retention of 98% and no gelation.

EXAMPLE 6

0.1 gram of Ionol, 2.5 grams of Buton 150 and 0.5 gram of Ledate were blended with 475 grams of the halogenated butyl rubber cement of Example 1 in accordance with the manner of Example 2 and tested in the Brabender. The resultant Brabended product showed a loss of 2.7% of initial bromine, a viscosity-average molecular weight decrease of 5%, a torque retention of 96% and no gelation.

EXAMPLE 7

Example 6 was repeated substituting natural rubber for the Buton 150. The Brabended product showed a loss of 3% of initial halogen, a viscosity-average molecular weight decrease of 6% and a torque retention of 98% with no gelation.

EXAMPLE 8

0.1 gram of Ionol, 2.5 grams of Buton and 0.25 gram of Ledate were blended with 475 grams of halogenated rubber cement as per the method of Example 2, and Brabended. The Brabended product showed a loss of 1.7% of initial halogen, a viscosity-average molecular weight decrease of 6% and no gelation.

EXAMPLE 9

0.5 gram of Ledate was blended with 475 grams of halogenated butyl cement in the manner shown in Example 2 and Brabended. The Brabended product showed a loss of 10% of initially combined bromine, a viscosity-average molecular weight decrease of 2.5% and no gelation.

EXAMPLE 10

475 grams of halogenated butyl cement were blended with 0.5 gram of Ledate and 2.5 grams of Buton 150. The rubber was recovered from solution by injecting steam to cause coagulation and evaporate the hexane. After drying in a vacuum oven at 50° C., the sample was Brabended under the standard conditions. The Brabended product showed a loss of 7% of the initial bromine, a decrease in viscosity-average molecular weight of 14%, a torque retention of 91% and no gelation.

The results of these experiments are tabulated in Table I. Table I shows that there is a definite synergistic effect between the Ledate and unsaturated compound which results in a low halogen loss and no gelation.

Neither agent by itself provides satisfactory control of both molecular weight and halogen loss.

another sample (A) of Enjay Butyl HT 10-68 without the improved stabilizer system.

TABLE I.—BRABENDER PERFORMANCE OF UNSATURATE-LEDATE SYSTEMS [1]

| Example No | 2 | 3 | 4 | 5 | 6 | 7 | 8 | 9 | 10 |
|---|---|---|---|---|---|---|---|---|---|
| Bromobutyl | 100 | 100 | 100 | 100 | 100 | 100 | 100 | 100 | 100 |
| Calcium stearate | [2] 2.5 | | | | | | | | |
| PX-441 (Ionol) | 0.2 | 0.2 | 0.2 | 0.2 | 0.2 | 0.2 | 0.2 | | |
| Natural rubber | | | 5.0 | | | 5.0 | | | |
| Buton 150 [3] | | 5.0 | | | 5.0 | | 5.0 | | 5.0 |
| Ledate [4] | | | | 1.0 | 1.0 | 1.0 | 0.5 | 1.0 | 1.0 |
| Brabended product: | | | | | | | | | |
| Loss of initial halogen, percent | 24 | 31 | 28 | 12 | 2.7 | 3 | 1.7 | 10 | 7 |
| $\overline{MV}$. loss [5], percent | 29 | 29 | 14 | 7 | 5 | 6 | 6 | 2.5 | 14 |
| Torque retention, percent | 117 | 91 | 95 | 98 | 96 | 98 | | | 91 |
| Gel, percent | 32 | 0 | 0 | 0 | 0 | 0 | 0 | 0 | 0 |

[1] All tests at 302° F. jacket temperature, 22 minutes, 63 r.p.m. rotor speed. Tests simulate polymer degradation which occurs during normal processing of the uncured rubber.
[2] All values given are parts per 100 parts of rubber.
[3] Polybutadiene having a molecular weight of about 1,500 to about 2,500.
[4] Lead dimethyl dithiocarbamate.
[5] Viscosity-average molecular weight.

EXAMPLE 11

Enjay Butyl HT 10-68, a chlorinated butyl rubber having a viscosity-average molecular weight of about 350,000 to 400,000, a mole percent unsaturation of 1.1% to 1.7% and a chlorine content of about 1.1 wt. percent to 1.3 wt. percent, was Brabended in the manner of Example 2 and found to have no halogen loss, no change in the viscosity-average molecular weight, 100% torque retention and no gel formation. Chlorobutyl rubber is inherently more stable to thermal degradation than bromobutyl rubber and is successfully processed commercially at higher temperatures conventionally used in extrusion drying, for example 375° F. However, the improved stabilizer systems of this invention confer stability on bromobutyl rubber surpassing that of Enjay Butyl HT 10-68. Table II shows the effect of Brabending chlorobutyl rubber at 350 to 375° F. as compared with the effect of Brabending a bromobutyl rubber stabilized according to the method of this invention at the same temperatures. Table II shows that the stabilization technique of this invention will impart a higher degree of stability to bromobutyl rubber than conventionally stabilized Enjay Butyl HT 10-68 will normally have.

TABLE II

| Min. | Chlorobutyl HT 10-68 | | Brominated butyl rubber | |
|---|---|---|---|---|
| | 350° | 375° | 350° | 375° |
| Brabending temperature | 350° | 375° | 350° | 375° |
| Evaluation of Brabended product: | | | | |
| Loss of initial halogen, percent | 12 | 69 | 24 | 31 |
| MV. retention, percent | [1]125 | 210 | 97 | 87 |
| Gel, percent | 0 | 66 | 0 | 0 |
| Brabender torque meter, grams 2 | 1,000 | 900 | 800 | 725 |
| 4 | 950 | 850 | 775 | 675 |
| 6 | 900 | 825 | 750 | 650 |
| 8 | 875 | 825 | 725 | 550 |
| 10 | 850 | 850 | 700 | 600 |
| 12 | 925 | 950 | 675 | 550 |
| 14 | 925 | 925 | 650 | 550 |
| 16 | 925 | 800 | 650 | 550 |
| 18 | 925 | 750 | 650 | 575 |
| 20 | 900 | 675 | 675 | 600 |
| 22 | 875 | 650 | 675 | 625 |

[1] The increase in viscosity-average molecular weight and the sharp rise in torque from 10 minutes to 12 minutes are indicative of gelation which, however, was not detected in the analysis.

The lower torque values for the brominated butyl rubber are a result of the plasticizing effect of Buton 150, which makes it an easier processing material.

EXAMPLE 12

The stabilizer systems of this invention also confer increased stability on unvulcanized chlorinated butyl rubber. A sample of Enjay Butyl HT 10-68 was mixed by milling with 5.0 phr. (parts per hundred parts of rubber) of Buton 150 and 1.0 phr. of Ledate. Table III compares the results of Brabending this sample (B) with those of Brabending

TABLE III

| Sample | A | B |
|---|---|---|
| Rubber | Conventionally Stabilized Enjay butyl 10-68 | Enjay butyl 10-68 Stabilized with Ledate & Buton 150 |
| Brabending conditions | ([1]) | ([2]) |
| Loss of initial halogen, percent | 64 | 0 |
| MV. decrease, percent | 87 | 36 |
| Torque retention, percent | 50 | 77 |
| Gel, percent | 79 | 0 |

[1] 350° F./22 min./63 r.p.m.
[2] 350° F./22 min./63 r.p.m.

The results of these experiments show that the use of a highly unsaturated compound such as natural rubber or Buton 150 in conjunction with a metal dithiocarbamate will result in an extremely stable halogenated butyl rubber which can safely undergo normal processing temperatures.

The shelf life, or storage stability, of brominated butyl rubber is marginal. After several months of storage, the material frequently contains gelled polymer. Any stabilizer system proposed for the purpose of imparting thermal stability during processing should also have the ability to inhibit viscosity changes and gelation during warehousing.

EXAMPLE 13

Samples of brominated butyl rubber containing different stabilizer combinations were exposed to accelerated aging conditions to determine the stabilizers' effectiveness for extending shelf life. For example, eight weeks exposure at 158° F. is roughly equivalent to 64 weeks exposure in a warehouse at an average temperature of 98° F. FIG. I shows the results of aging samples for 2, 4 and 8-week periods at 158° F.

Sample 05-0 containing calcium stearate (2.5 phr.) and Ionol (0.2 phr.) gelled in less than two weeks. (phr. is defined as parts per hundred parts of rubber.)

Sample 05-1 containing natural rubber (5 phr.), lead dimethyl dithiocarbamate (Ledate 1.0 phr.) and Ionol (0.2 phr.) showed an increase in viscosity during the first 4 weeks of exposure and contained 70% gel after 8 weeks.

Samples 05-2 and 05-3, although showing moderate increases in viscosity, contained no gel. The beneficial effect of Buton 150 resin in sample 05-2 is shown by comparison of the slopes of the curves for these two samples.

These data indicate that the stabilizer systems of this invention substantially improve the storage stability of bromobutyl rubber at 158° F. The addition of Buton 150 to the basic Ledate/Ionol system further extends the shelf life of the polymer. Extrapolation of these data indicate a shelf life of at least one year at an average temperature of 98° F.

EXAMPLE 14

Although various ultra-accelerators are known to be useful in preparing heat stable covulcanizates of halogenated butyl rubbers and highly unsaturated rubbers such as polybutadienes (British Pat. 862,698), many of this group of rubber compounding ingredients are harmful in the present process. Table IV indicates the results of inclusion of 1 phr. of various ultra-accelerators in otherwise identical compounds of a brominated butyl rubber prepared according to Example 1 and tested according to Example 2. The products of runs B, C, D, E and G had unacceptably high levels of bromine loss; those of runs C, D, E and F were unacceptable because of gel formation and/or molecular weight loss.

TABLE IV

| | | Brabended product | | |
|---|---|---|---|---|
| Run | Stabilizer[1] | Bromine loss, percent | $\overline{MV}$. loss, percent | Gel, percent |
| A | Ledate (lead dimethyldithiocarbamate) | 9 | 5 | 0 |
| B | Tellurac (tellurium diethyldithiocarbamate) | 18 | 7 | 0 |
| C | Tuads (tetramethylthiuram disulfide) | 19 | [2]NA | 11.2 |
| D | DOTG (di-o-tolylguanidine) | 19 | 19 | 0 |
| E | Stannous chloride | 31 | NA | 38 |
| F | GMF (p,p'-dibenzoylquinonedioxime) | 5 | NA | 45 |
| G | Atlax (benzothiazyl disulfide) | 41 | 1 | 0 |

[1] Listed components used at 1 phr. 5 phr. Buton 150 and .2 phr. Parabar 441 included in all tests.
Base rubber contained 2.31% bromine and had an average $\overline{MV}$. of 442,000.
[2] NA=not applicable because of gel.

Since many different embodiments of this invention may be made without departing from the spirit and the scope thereof, it is to be understood that the present invention is not limited to the specifically disclosed examples thereof.

What is claimed is:

1. A method for heat stabilizing an uncured halogenated butyl rubber consisting essentially of compounding the rubber by:
   (1) dissolving from 1 to 60% by weight of a halogenated butyl rubber selected from the group consisting of brominated butyl rubber and chlorinated butyl rubber in a hydrocarbon solvent selected from the group consisting of aliphatic, cycloaliphatic and aromatic or mixtures thereof;
   (2) admixing with the halogenated butyl rubber solution:
      (a) 0.1–5.0 parts per hundred, based on rubber, of a heavy metal dialkyl dithiocarbamate where the heavy metal is selected from the group consisting of lead, tin, zinc, cadmium, tellurium, nickel, selenium, copper and bismuth, and mixtures thereof;
      (b) about 1–10 parts per hundred, based on the rubber, of an unsaturated compound having a molecular weight of about 500 to about 1,000,000 and an iodine number of about 100 to 400;
   (3) separating the compound rubber from the solvent; and
   (4) drying the resultant compounded rubber at a temperature of about 350° F. to about 450° F.

2. The method of claim 1 where the heavy metal dialkyl dithiocarbamate is lead dimethyl dithiocarbamate, tellurium diethyl dithiocarbamate or zinc dibutyl dithiocarbamate.

3. The process of claim 1 wherein about 0.05 to about 0.5 part per hundred, based on the rubber, of an antioxidant selected from the group consisting of 2,6-di-t-butyl - 4 - methylphenol, 4 - 4' - thiobis - 3 - methyl - 6 - t-butylphenol, phenyl-beta naphthylamine, 4,4'-methylenebis(2,6-di-tertiary butyl phenol), and p-isopropoxy, diphenylamine is admixed with the other constituents in step (2) of claim 1.

4. The process of claim 3 wherein the halogenated butyl rubber is brominated butyl rubber, the dithiocarbamate is lead dimethyl dithiocarbamate, the unsaturated compound is selected from the group consisting of polybutadiene having a molecular weight between 1500–10,000 and uncured natural rubber, and the antioxidant is 2,6-di-t-butyl-4-methylphenol.

5. The process of claim 4 wherein the lead dimethyl dithiocarbamate is present in about 0.5 to about 1.0 parts per hundred, based on the rubber, the antioxidant is present at about 0.2 part per hundred, based on the rubber, and the unsaturated compound is polybutadiene having a viscosity average molecular weight of about 1500 to 10,000 present at about 4 to about 6 parts per hundred, based on the rubber.

6. The process of claim 3 wherein the halogenated butyl rubber is chlorinated butyl rubber, the dithiocarbamate is lead dimethyl dithiocarbamate, the unsaturated compound is selected from the group consisting of polybutadiene having a molecular weight between 1500–10,000 and uncured natural rubber, and the antioxidant is 2,6-di-t-butyl-4-methylphenol.

7. A method of stabilizing an uncured halogenated butyl rubber selected from the group consisting of brominated butyl rubber and chlorinated butyl rubber consisting essentially of milling at about 70° F. to about 375° F. the halogenated butyl rubber with:
   (1) about 0.1 to about 5.0 part per hundred, based on the rubber, of a heavy metal dialkyl dithiocarbamate wherein the heavy metal is selected from the group consisting of lead, tin, zinc, cadmium, tellurium, nickel, selenium, copper and bismuth, and mixtures thereof; and
   (2) about 1 to about 10 parts per hundred, based on the rubber, of an unsaturated compound having a molecular weight of about 1500 to about 10,000 and an iodine number of about 100 to about 400.

8. The method of claim 7 wherein the heavy metal dialkyl dithiocarbamate is lead dimethyl dithiocarbamate, tellurium diethyl dithiocarbamate or zinc dibutyl dithiocarbamate.

9. The process of claim 7 wherein about 0.05 to about 0.5 part per hundred, based on the rubber, of an antioxidant selected from the group consisting of 2,6-di-t-butyl - 4 - methylphenol, 4 - 4' - thiobis - 3 - methyl - 6 - t-butylphenol, phenyl-beta naphthylamine, 4,4'-methylenebis(2,6-di-tertiary butylphenol), and p-isopropoxy diphenylamine is admixed with the other constituents of claim 6.

10. The process of claim 9 wherein the halogenated butyl rubber is brominated butyl rubber, the dithiocarbamate is lead dimethyl dithiocarbamate, the unsaturated compound is selected from the group consisting of polybutadiene having a molecular weight between 1500–10,000 and uncured natural rubber, and the antioxidant is 2,6-di-t-butyl-4-methylphenol.

11. The process of claim 10 wherein the lead dimethyl dithiocarbamate is present in about 0.5 to about 1.0 parts per hundred, based on the rubber, the antioxidant is present at about 0.2 part per hundred, based on the rubber, and the unsaturated compound is polybutadiene having a molecular weight of about 1500 to 10,000 present at about 4 to about 6 parts per hundred based on the rubber.

12. A vulcanizable composition consisting essentially of uncured halogenated butyl rubber selected from the group consisting of brominated butyl rubber and chlorinated butyl rubber together with:
(1) about 0.1–5.0 part per hundred, based on the rubber, of a dithiocarbamate selected from the group consisting of lead dimethyl dithiocarbamate, zinc dimethyl dithiocarbamate and tellurium diethyl dithiocarbamate;
(2) about 1 to about 10 parts per hundred, based on the rubber, of an unsaturated compound having a molecular weight of about 500 to about 10,000 and an iodine number of about 100 to about 400; and
(3) about 0.05 to about 0.5 part per hundred, based on the rubber, of an antioxidant selected from the group consisting of 2,6-di-t-butyl-4-methylphenol and 4-4'-thiobis-3-methyl-6-t-butylphenol.

13. The composition of claim 12 wherein the halogenated butyl rubber is brominated butyl rubber, the dithiocarbamate is lead dimethyl dithiocarbamate present at about 0.5 to about 1.0 part per hundred, based on the rubber, the unsaturated compound is selected from the group consisting of uncured natural rubber and polybutadiene having a molecular weight of about 1500 to 2500 present at about 4 to about 60 parts per hundred, based on the rubber, and the antioxidant is 2,6-di-t-butyl-4-methylphenol, present at about 0.2 part per hundred, based on the rubber.

14. The composition of claim 12 wherein the halogenated butyl rubber is chlorobutyl rubber, the dithiocarbamate is lead dimethyl dithiocarbamate present at about 0.5 to about 1.0 part per hundred, based on the rubber, the unsaturated compound is selected from the group consisting of uncured natural rubber and polybutadiene having a molecular weight of about 1500 to 2500 present at about 4 to about 6.0 parts per hundred, based on the rubber, and the antioxidant is 2,6-di-t-butyl-4-methylphenol, present at about 0.2 part per hundred, based on the rubber.

References Cited

UNITED STATES PATENTS

| 2,926,718 | 3/1960 | Baldwin et al. | 260—888 |
| 2,944,578 | 6/1960 | Baldwin et al. | 260—888 |
| 2,955,103 | 10/1960 | Baldwin et al. | 260—888 |
| 2,983,705 | 5/1961 | Baldwin et al. | 260—888 |

MURRAY TILLMAN, Primary Examiner

M. J. TULLY, Assistant Examiner

U.S. Cl. X.R.

260—5, 23.7, 33.6, 45.7, 45.75, 85.3